United States Patent [19]

Ohashi et al.

[11] Patent Number: 5,018,054
[45] Date of Patent: May 21, 1991

[54] EXPOSURE DEVICE WITH FILTER

[75] Inventors: Kunio Ohashi; Mitsuru Ogura, both of Nara, Japan

[73] Assignee: Sharp Kabushiki Kaisha, Osaka, Japan

[21] Appl. No.: 511,798

[22] Filed: Apr. 20, 1990

[30] Foreign Application Priority Data

Apr. 24, 1989 [JP] Japan ..................... 1-48117

[51] Int. Cl.⁵ .............. F21V 9/00; F21S 3/00
[52] U.S. Cl. ..................... 362/211; 362/217; 362/263; 362/293; 313/112; 313/273
[58] Field of Search ............ 362/217, 263, 293, 211, 362/307; 313/112, 273

[56] References Cited

U.S. PATENT DOCUMENTS

| 3,188,513 | 6/1965 | Hansler | 362/293 X |
| 3,295,007 | 12/1966 | Young | 313/273 |
| 3,449,045 | 6/1969 | Roul | 362/293 X |
| 3,943,395 | 3/1976 | Huston et al. | 313/273 |
| 4,626,791 | 11/1986 | Combastel | 362/243 X |
| 4,959,586 | 9/1990 | Claessers et al. | 313/273 |

FOREIGN PATENT DOCUMENTS 63-259635 10/1988 Japan.
2041643 9/1980 United Kingdom ........ 313/273

*Primary Examiner*—Stephen F. Husar
*Assistant Examiner*—Peggy A. Neils

[57] ABSTRACT

An exposure device has a bar-like lamp with a filament having luminescent and non-luminescent members connected in alternating series. A filter is disposed in the vicinity of the lamp and is composed of a plurality of filter plates arranged in a longitudinal direction of the filament. Seams between the filter plates are positioned vis-á-vis with the non-luminescent members of the filament of the lamp to reduce disturbances by the seams to the light emerging from lamp.

7 Claims, 3 Drawing Sheets

EXPOSURE DEVICE WITH FILTER

BACKGROUND OF THE INVENTION

1. Field of the Invention

The present invention is directed generally to an exposure device for use with a copying machine or the like, and more particularly, to an exposure device with a filter for absorbing rays of heat produced by a light source.

2. Description of the Prior Art

A typical arrangement of a copying machine is that: an original is placed on an original board composed of transparent hard glass; the original undergoes an exposure via the original board by means of a light source such as a halogen tungsten lamp; and the light reflected therefrom is led again via the original board to an exposure point to expose a photosensitive material (a photosensitive/pressure-sensitive sheet, a photoconductive drum or the like), thus forming a latent image. Beams of light emitted from the light source, however, have wavelengths containing the heat rays (near infrared rays), and in some cases the original board may be heated up for a long stretch of exposure. To cope with this, preventing the heat-up of the original board hitherto involved the use of a filter, disposed in front of the light source, for absorbing or reflecting the heat rays (towards the light source).

The thus arranged exposure device, however, presents such problems that repetitions of exposing/stopping cause the filter to be heated up and cooled down repeatedly. The repetitions thereof lead to a fragility of the filter, resulting in cracks or warps thereof.

As a countermeasure against such problems, the filter is split into a plurality of blocks to lessen the distortions caused by the repetitions of heating/cooling process (the arrangement being disclosed in Japanese Patent Laid-Open No. 259635/1988).

SUMMARY OF THE INVENTION

The present invention provides an exposure device with a filter, comprising a bar-like lamp including a filament constructed of a plurality of luminescent members and non-luminescent members which are connected in series alternately, and a filter disposed in the vicinity of the lamp, in which the filter is composed of a plurality of filter plates arrayed in a longitudinal direction of a light source, and seams of the filter plates are set vis-a-vis with the non-luminescent members of the filament of the lamp.

The filter plate typically assumed a rectangular shape but may take a parallelogram or trapezoid shape to further disperse beams of light at the seams. The filter is required to be a heat (infrared rays) absorbing filter (e.g., glass containing iron ions) when preventing an object for exposure from being heated up by the lamp or a heat (infrared rays) reflection filter (e.g., a glass plate coated with $In_2O_3$). Other kinds of filters may, however, be employed depending on the applications of the exposure device. In general, the lamp for use may be a halogen tungsten lamp but is not limited to this type of lamp.

According to the present invention, the filter is divided into a plurality of blocks, thereby making it possible to reduce the distortions created by repetitive heating/cooling processes. In accordance with the present invention, the seams of the divided blocks of the filter are arranged opposite to the non-luminescent members of the light source, whereby the filter is capable of reducing influences exerted on distributions of light emerging from the light source to the greatest possible degree.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 5:
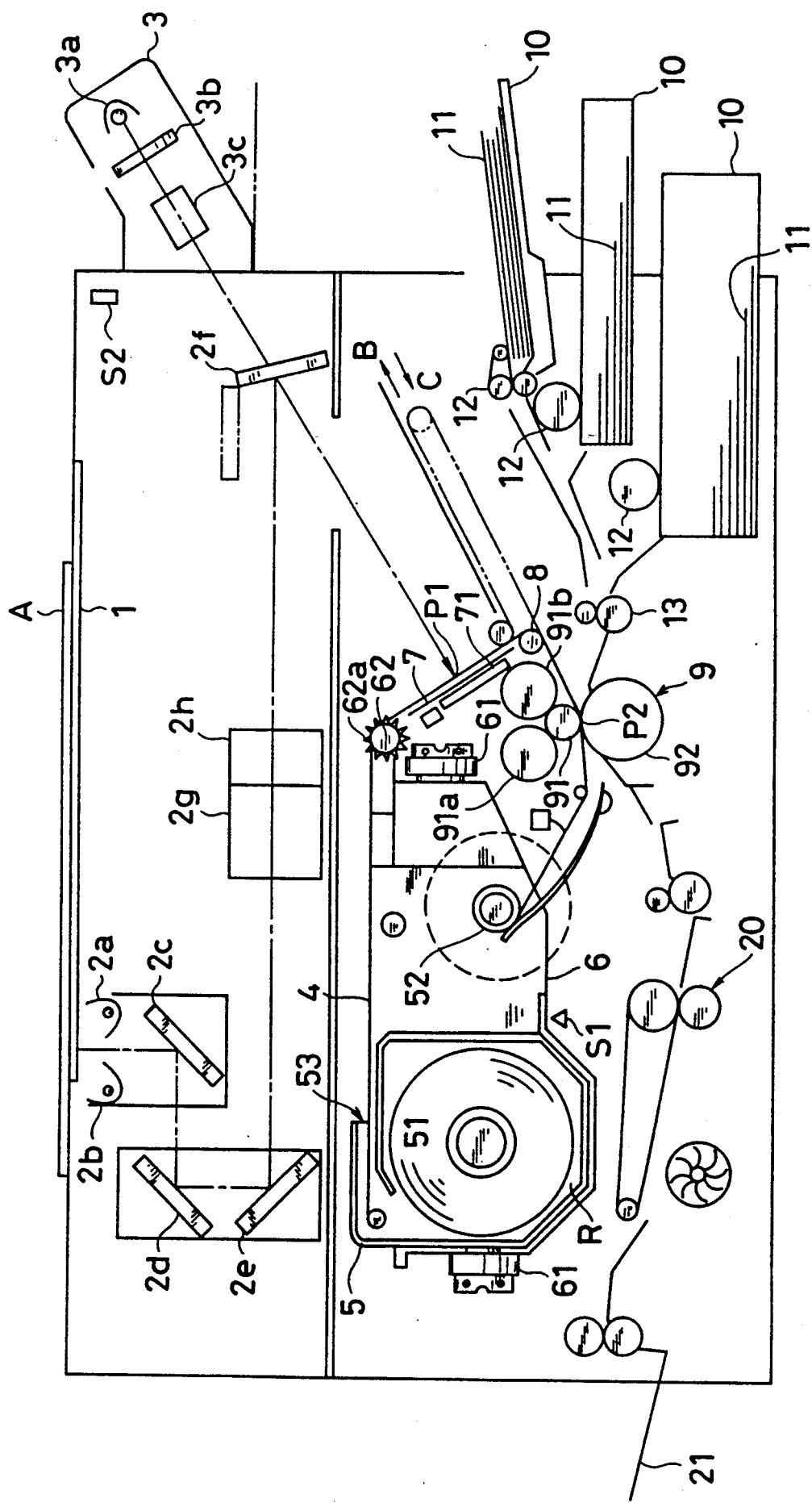
FIG. 5 is a block diagram schematically showing a copying machine incorporating the exposure device.

Turning first to FIG. 5, there is illustrated a schematic block diagram of an image forming device.

Mounted on an upper surface of an image forming device is an original board 1 made of transparent hard glass, on which an original A to be copied is placed with its original face set downwards. Provided downwardly of the original board 1 is an optical system 2 including light sources 2a and 2b, mirrors 2c through 2f, a lens 2g and a filter 2h. The original A set on the original board 1 is exposed by means of the light sources 2a and 2b, and the light reflected therefrom is led via the mirrors 2c through 2f, the lens 2g and the filter 2h to an exposure point which will hereinafter be explained. Note that the filter 2h includes a plurality of filter plates each having a different transmission wavelength, and color corrections of beams of light reflected from the original are effected by adjusting amounts of insertions of the respective filter plates into light paths. The amounts of insertions of the filter plates are determined in accordance with sensitivity of a medium sheet and image colors desired by the user.

Figure 1:
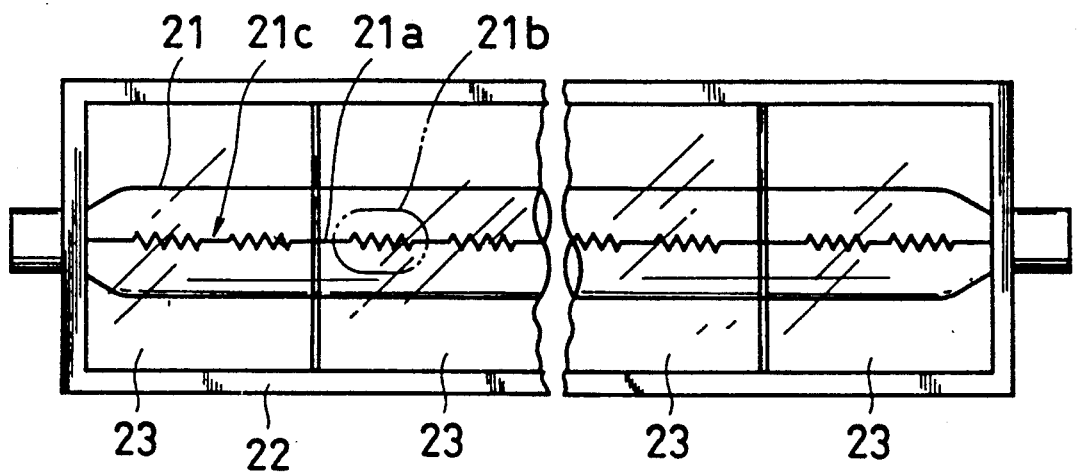
FIG. 1(A) is a side view illustrating an exposure device in an embodiment of the present invention.
FIG. 1(B) is a front sectional view thereof.
Figure 1:
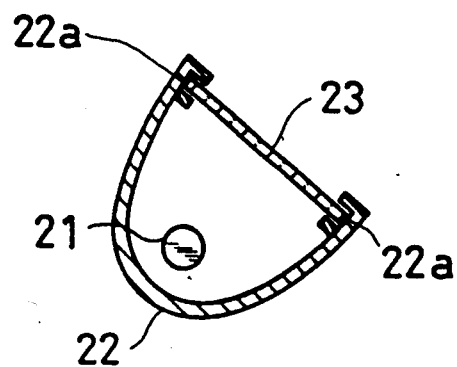

The light sources 2a and 2b are equipped with heat-ray absorbing filter plates. FIG. 1(A) is a side view illustrating the light source; FIG. 1(B) is a front sectional view thereof; and FIG. 2 is a perspective view depicting the light source.

A lamp serving as a light source involves the use of, e.g., a halogen tungsten lamp 21 having an electric power of 500 W, an outside diameter of 8 mm and a length of 362 mm. Disposed behind the halogen tungsten lamp 21 is a reflector 22 for converging beams of light towards the original, a front surface opening (on the side of the original) of which is charged with a plurality of filter plates 23 for absorbing heat rays. The filter 23 is constructed by using iron-ion-contained glass ISK-150 (manufactured by ISUZU SEIKO GLASS CO., Japan) for absorbing infrared rays of 800 to 2000 nm. The reflector 22 has an opening formed with a groove 22a into which the filter plates 23 are fitted. On the other hand, a filament 21c of the halogen tungsten lamp 21 is constructed in such a way that a plurality of non-luminescent members 21a and luminescent members (segments) 21b are connected in series alternately. The luminescent member exhibits a high luminance. Note that the non-luminescent members 21a are supported by unillustrated supporters, the filament 21c is thereby supported substantially on an axial core of the lamp 21. The luminescent member 21b is composed of a tungsten wire, while the non-luminescent member 21a is formed of a molybdenum wire. Seams of the plurality of filter plates 23 are set vis-a-vis with the non-luminescent members 21a. The reason for this is that if the seams are set corresponding to the segments 21b, irregular reflection light increases, resulting in adverse influences on the image.

Figure 2:
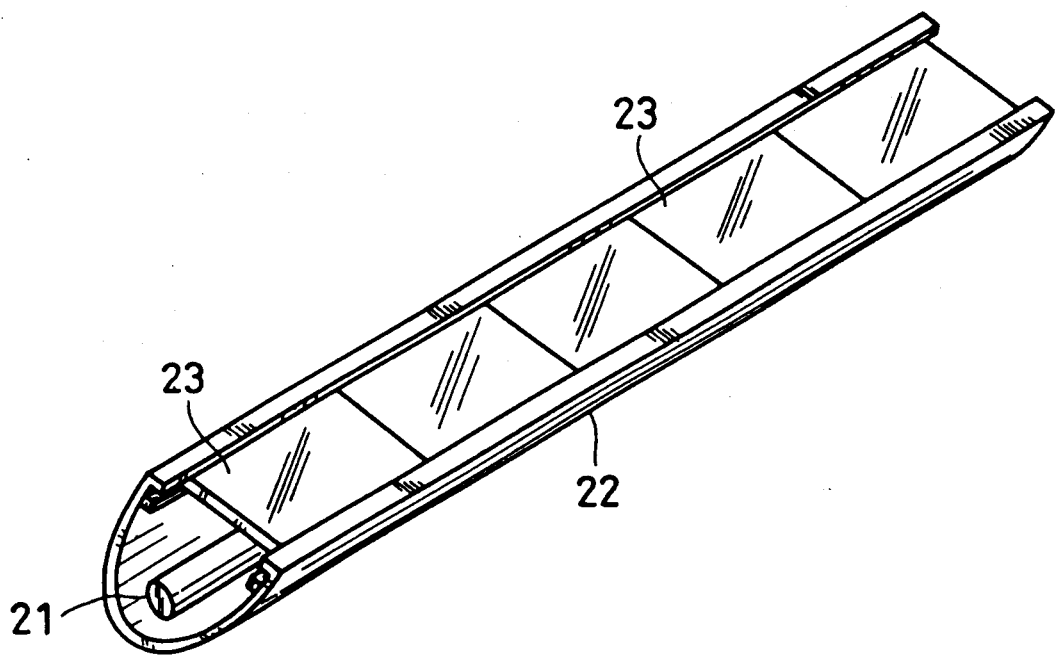
FIG. 2 is a perspective view thereof.
Figure 3:
FIGS. 3 and 4 are diagrams depicting filter configurations in other embodiments.
Figure 4:

It is to be noted that the filter plate 23 assumes rectangular configurations depicted in FIGS. 1(a) and 2 but may have other shapes such as a parallelogram and trapezoid as illustrated in FIGS. 3 and 4. With this arrangement, the irregular reflection in the longitudinal direction is dispersed to make an amount of light uniform in the same direction. A glass plate, coated with $In_2O_3$, for reflecting the heat rays, may be employed as a filter.

Attached detachably to the right side of the image forming device is a slide projector 3 including a light source 3a, a slide holding member 3b and a lens 3c having a color correction filter. A slide film to be printed is inserted into the slide holding member 3b. On the other hand, the mirror 2f of the optical system for the original reflection light is arranged to be rotatable, the mirror being rotated substantially through 90 degrees by turning a knob (not illustrated) fitted to the front surface of the image forming device. When rotating the mirror 2f (a state indicated by a two-dotted chain line in the Figure), the light transmitting the slide film inserted into the slide holding member 3b is led via the lens 3c to an exposure point. Note that if the light source 3a is provided with a heat-ray absorbing filter, it is possible to prevent a rise in ambient temperature of the light source.

A fitting member for a medium sheet is formed on the left side of an interior of the image forming device. The medium sheet 4 is manufactured such that a sheet made of a photoreflective material such as aluminum is coated with microcapsules each having a particle diameter of approximately 10 to 20 $\mu$m and filled with a coloring dyestuff. The microcapsule is hardened by exposure and ruptured by pressurization, with the result that the coloring dyestuff flows out. The medium sheet is coupled with a receiver sheet, which will be mentioned later, to be formed into a photosensitive/pressure-sensitive sheet. Note that the receiver sheet is formed by coating a developing material (for causing the coloring dyestuff to color) and a thermosetting resin over the paper.

The medium sheet 4 is wound on a feed shaft 51 and protected both from the outside light and from the outside pressure by its being stored in an accommodation chamber R. The feed shaft 51 is lockable by a ratchet mechanism including a solenoid. A medium cartridge 5 is equipped with a take-up shaft 52 for taking up the medium sheet used. The take-up shaft 52 is constantly biased in a winding direction so as not to slacken the medium sheet 4. The medium sheet 4 and the cartridge 5 are replaced en bloc.

The replacement of the medium cartridge 5 is carried out by taking it into and out of a bucket 6. The bucket 6 is so mounted on the front surface of the image forming device as to be retractable along a set of sliders 61, thereby loading the medium cartridge 5 from above. Provided at a right upper end of the bucket 6 is a tractor roller 62 an end periphery of which is formed with pins 62a. While in a new medium cartridge 5, the top of the medium sheet 4 is slightly protruded from the opening 53 of the accommodating chamber R and pulled out by a hand to hang it on the tractor roller 62. A highly elastic leader sheet which is a little bit wider than the medium sheet is stuck to the top of the medium sheet. Holes formed in both ends of the leader sheet are caught by the pins 62a. The leader sheet is hung on the tractor roller, and the bucket 6 is intruded into the image forming device body, thereby turning ON a bucket sensor S1. When closing a front cover of the image forming device body, a cover switch S2 is turned ON. The ON-states of the sensor S1 and the switch S2 lead to auto-loading (auto-setting) of the medium sheet.

An exposure board 7, a buffer roller 8 and a pressure developing unit 9 are located on the right side of a medium sheet fitting unit. Based on auto-loading, the medium sheet caught by the tractor roller 62 at initial setting is wound up by the take-up shaft 52 through the exposure board 7, the buffer roller 8 and the pressure developing unit 9. The original reflection light or the slide transmission light is led to an exposure point P1 formed on the exposure board 7, whereby the medium sheet 4 undergoes an exposure. Immediately, a latent image (formed by hardening partial microcapsules) corresponding to the original or the slide image is formed on the medium sheet 4. Note that the numeral 71 designates a heater which is turned ON at the time of exposure and provided for keeping constant a photosensitivity of the medium sheet 4, because the photosensitivity varies according to temperatures.

The pressure developing unit 9 includes upper and lower pressure rollers 91 and 92. A pressure developing point P2 exists between the upper and lower pressure rollers 91 and 92. Provided above the upper pressure roller 91 are backup rollers 91a and 91b for imparting, to the upper pressure roller 91, downward biasing forces that are uniform in an axial direction. Unillustrated spring and cam serve to adjust pressurization and pressurizing forces and also release the pressures on the upper and lower pressure rollers. It is to be noted that the upper and lower pressure rollers 91 and 92 are subjected to adequate pressures only when effecting pressure developing and are released from the pressures in other states.

The buffer roller 8 is so provided as to be movable in arrowed directions B and C as shown in the FIG. 5 by means of an unillustrated motor. In the image forming device, the pressure developing process is performed after finishing the exposing process with a view to setting an exposing velocity and a pressure developing velocity, separately, thereby enhancing an image quality. The buffer roller 8 is intended to change a velocity at which the medium sheet is carried. In the case of the exposing process, the exposure is effected while moving the buffer roller 8 in the arrowed direction B. Thereupon, the medium sheets 4 on which the latent images have been formed are accumulated in a buffer unit located at a right upper portion of the exposure board.

Upon a completion of the exposure, the buffer roller 8 moves in the arrowed direction C and feeds the medium sheets on which the latent images have been formed to the pressure developing unit 9. At this time, the latent image on the medium sheet 4 is overlapped with a receiver sheet, and they are pressurized together.

Attached to a right side surface of the image forming device body is a paper cassette 10 for accommodating receiver sheets 11 which are in turn fed out by means of a paper feeder 12. The receiver sheets 11 are temporarily stopped by a timing roller 13 and fed at timings when the latent images on the medium sheets are overlapped therewith. When tops of the latent image on the medium sheet 4 and of the receiver sheet 11 reach the pressure developing point P2, the sheets 4 and 11 are temporarily halted, and the upper and lower pressure rollers 91 and 92 are pressurized. After the pressurization has been well done, the upper and lower pressure rollers 91 and 92 rotate, thus performing the pressure developing process. Note that the buffer roller 8 also, as discussed above, moves in the arrowed direction C by the motor. When the medium sheet 4 and the receiver sheet 11 are pressurized while being superposed on each other, the microcapsules which are not yet hardened are ruptured to cause outflows of the coloring dyestuffs. The dyestuffs are made to color with developing materials, thus forming an image on the receiver sheet. Thereafter, the medium and receiver sheets are peeled off. The medium sheets 4 are taken up by the take-up shaft 52, while the receiver sheets 11 are fed to a lustering unit 20.

The lustering unit 20 works to soften the resin on the receiver sheet 11 by heat-pressurization to cover the softened resin on the image surface and further smooth the surface. The image is thus lustered. The above-mentioned heating process promotes coloring reaction of the coloring dyestuff. The sheets with the thus finished images are ejected to a paper ejection tray 21 fitted to a left side surface of the image forming device body.

As discussed above, in accordance with the present invention, the distortions caused by repeating the heating/cooling operations with respect to the filter plates can be reduced, thereby preventing damage to the filter plates and deformations thereof. The seams of the filter plates are set to steer clear of the greater light quantity portions, whereby the adverse influences on the light distribution can be prevented. Hence, the images formed do not exhibit any scatter of density.

Although the illustrative embodiments of the present invention have been described in detail with reference to the accompanying drawings, it is to be understood that the present invention is not limited to those precise embodiments. A variety of modifications or changes may be effected therein by one skilled in the art without departing from the scope or spirit of the invention.

We claim:

1. An exposure device with a filter, comprising a bar-like lamp including a filament constructed of a plurality of luminescent members and non-luminescent members which are connected in series alternately, and a filter disposed in the vicinity of said lamp, said filter being composed of a plurality of filter plates arranged in a longitudinal direction of the filament, seams between said filter plates being set vis-a-vis with said non-luminescent members of said filament of said lamp.

2. The exposure device of claim 1, in which each of said filter plates has a rectangular configuration.

3. The exposure device of claim 1, in which each of said filter plates has a parallelogram configuration.

4. The exposure device of claim 1, in which each of said filter plates has a trapezoid configuration.

5. The exposure device of claim 1, in which said filter plates are heat absorbing filter plates.

6. The exposure device of claim 1, in which said filter plates are heat reflection filter plates.

7. The exposure device of claim 1, in which said lamp is a halogen tungsten lamp.

* * * * *